(12) United States Patent
Kakuta (10) Patent No.: US 8,090,290 B2
(45) Date of Patent: Jan. 3, 2012

(54) ATTACHMENT STRUCTURE OF AUTOMATIC DOCUMENT FEEDER, AND IMAGE-READING DEVICE AND IMAGE-FORMING APPARATUS INCLUDING THE SAME

(75) Inventor: Masayuki Kakuta, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 421 days.

(21) Appl. No.: 12/479,187

(22) Filed: Jun. 5, 2009

(65) Prior Publication Data
US 2010/0061758 A1 Mar. 11, 2010

(30) Foreign Application Priority Data

Sep. 9, 2008 (JP) .................. 2008-230467

(51) Int. Cl.
*G03G 15/00* (2006.01)
(52) U.S. Cl. ........................ 399/110; 399/125
(58) Field of Classification Search .......... 399/110, 399/125; 16/50, 54, 221, 249, 269, 281, 16/282, 286, 287, 294, 302, 357, 366, 368, 16/369, 370, 382, DIG. 43
See application file for complete search history.

(56) References Cited

U.S. PATENT DOCUMENTS

| 5,220,393 | A * | 6/1993 | Otomo | 399/125 |
| 6,418,589 | B1 * | 7/2002 | Salice | 16/258 |
| 6,760,955 | B2 * | 7/2004 | Salice | 16/382 |
| 2007/0089271 | A1 * | 4/2007 | Jo et al. | 16/286 |
| 2008/0040979 | A1 * | 2/2008 | Katsumata et al. | 49/405 |
| 2008/0109987 | A1 * | 5/2008 | Chen et al. | 16/68 |
| 2008/0172834 | A1 * | 7/2008 | Sutterlutti | 16/286 |

FOREIGN PATENT DOCUMENTS
JP 09-105266 4/1997
* cited by examiner

*Primary Examiner* — David Gray
*Assistant Examiner* — Rodney Bonnette
(74) *Attorney, Agent, or Firm* — K&L Gates LLP

(57) ABSTRACT

An attachment structure is provided that includes a hinge unit for supporting a document feeder and a hinge attachment for fixing the hinge unit having an engagement pin and a retainment hook.

7 Claims, 6 Drawing Sheets

ATTACHMENT STRUCTURE OF AUTOMATIC DOCUMENT FEEDER, AND IMAGE-READING DEVICE AND IMAGE-FORMING APPARATUS INCLUDING THE SAME

INCORPORATION BY REFERENCE

This application is based upon and claims the benefit of priority from the corresponding Japanese Patent application No. 2008-230467 filed Sep. 9, 2008, the entire contents of which are incorporated herein by reference.

BACKGROUND

1. Field of the Invention

The present invention relates to attachment structures for automatic document feeders which feed documents to a predetermined image-reading position, and to image-reading devices and image-forming apparatuses including the attachment structure.

2. Description of the Related Art

Image-forming apparatus can include an automatic document feeder and an image-reading section. A document set on a document tray of the automatic document feeder is fed to an image-reading position, of the image-reading section, and then the image on the document is read.

The automatic document feeder is rotatably supported by one end of an image-forming apparatus body using a hinge unit. A document set on the image-reading section is pressed to the image-reading position by a lower surface of the automatic document feeder. Then, the image surface of the document is read.

In a situation where the image-forming apparatus uses an electrophotographic process, an electrostatic latent image is formed by previously charging a photosensitive drum with electricity and irradiating a surface of the photosensitive drum with a laser beam. The electrostatic latent image is developed into a toner image. The toner image is transferred onto and fixed to a sheet.

Here, to mount the above-described automatic document feeder on the image-forming apparatus body, the hinge unit is attached to the automatic document feeder, the automatic document feeder is lifted up such that the hinge unit is arranged at a lower position or that the automatic document feeder is standing, the hinge unit is temporarily fixed to an upper surface of the image-forming apparatus body, and then the hinge unit and the image-forming apparatus body are fastened by a screw (for example, see Japanese Unexamined Patent Application Publication No. 9-105266).

However, with this technique, it is still difficult to mount the automatic document feeder. Specifically, the automatic document feeder may weigh approximately 15 kg. Thus, it is difficult for it to stand without a support (in a self-standing state). In order to prevent the automatic document feeder from falling to the opposite side, a worker has to fasten the screw while another worker supports the automatic document feeder. When the above-described technique is used, a single worker can complete the attachment process. In this situation, however, the hinge unit is merely temporarily fixed to the upper surface of the image-forming apparatus body at one position. The worker has to fasten the screw with one hand while supporting the automatic document feeder with the other hand.

Even if the hinge unit is temporarily fixed to the upper surface of the image-forming apparatus body at a plurality of positions, when the positions are close to each other, the posture of the image-forming apparatus body may become unstable. Therefore, it is difficult to keep the automatic document feeder in a self-standing state.

SUMMARY

The present invention provides an attachment structure for an automatic document feeder capable of reliably maintaining the self-standing state of the automatic document feeder and an image-reading device and an image-forming apparatus including the attachment structure.

According to an embodiment of the invention, an attachment structure, for an automatic document feeder, is mounted in a manner such that it is able to be opened and closed with respect to an upper surface of an apparatus at which an image-reading section is provided. The attachment structure includes a hinge unit which rotatably supports the automatic document feeder at one end of the upper surface of the apparatus, plus a hinge attachment member fixed to the upper surface of the apparatus and coupled to the hinge unit. The hinge attachment member includes a base portion on which the hinge unit is mounted, an engagement protrusion provided on an upper surface of the base portion at the end that is located at the rear side of the apparatus, the engagement protrusion engaging with and holding the hinge unit, and a retainment hook provided at the other end that is located on the front side of the apparatus, with the retainment hook preventing the automatic document feeder from falling.

In the above configuration, preferably, the hinge unit may include a fixed member coupled to the hinge attachment member, and a movable member coupled to the automatic document feeder. The fixed member portion may include a bottom surface. The bottom surface may have an engagement hole that engages with the engagement protrusion, and a retainment portion provided at the other end and being capable of engaging with the retainment hook.

In the above configuration, preferably, the retainment hook may include a leg extending vertically from the base portion, and a claw extending substantially horizontally from the leg toward one end side. The engagement hole may have an engagement portion provided at one end side and engaging with the engagement protrusion, and an insertion portion which extends from the engagement portion toward the other end side and allows the engagement protrusion to be inserted. The retainment portion may be capable of engaging with the claw while engagement between the engagement protrusion and the engagement portion is achieved by inserting the engagement protrusion into the insertion portion of the fixed member and sliding the fixed member toward the other end side.

In the above configuration, preferably, the claw retains the retainment portion as a support point while the automatic document feeder is inclined, with the projection acting as a fulcrum toward the rear side of the apparatus such that the engagement protrusion is engaged with the engagement hole of the fixed member.

In a situation where the hinge unit with the automatic document feeder attached thereto is to be mounted on the upper surface of the apparatus body, the automatic document feeder can be prevented from falling to the rear side and the self-standing state can be maintained because the retainment hook provided at the end surface opposite the engagement protrusion engages with the engagement portion of the hinge unit near the front side to stop rotation of the hinge unit, although the hinge unit, i.e., the automatic document feeder, is inclined to the rear side around the engagement protrusion when the hinge unit is mounted on the base portion of the hinge attachment member. Accordingly, the attachment work of the automatic document feeder on the upper surface of the apparatus can be facilitated.

An image-reading device and an image-forming apparatus including the attachment structure of the automatic document feeder are also provided by the present invention.

Pursuant to the present invention, the time required for assembling the image-reading device and the image-forming apparatus with the automatic document feeder can be reduced and the manufacturing cost of the image-reading device and the image-forming apparatus with the automatic document feeder can be reduced.

Additional features and advantages are described herein, and will be apparent from the following Detailed Description and the figures.

DETAILED DESCRIPTION

Figure 1:
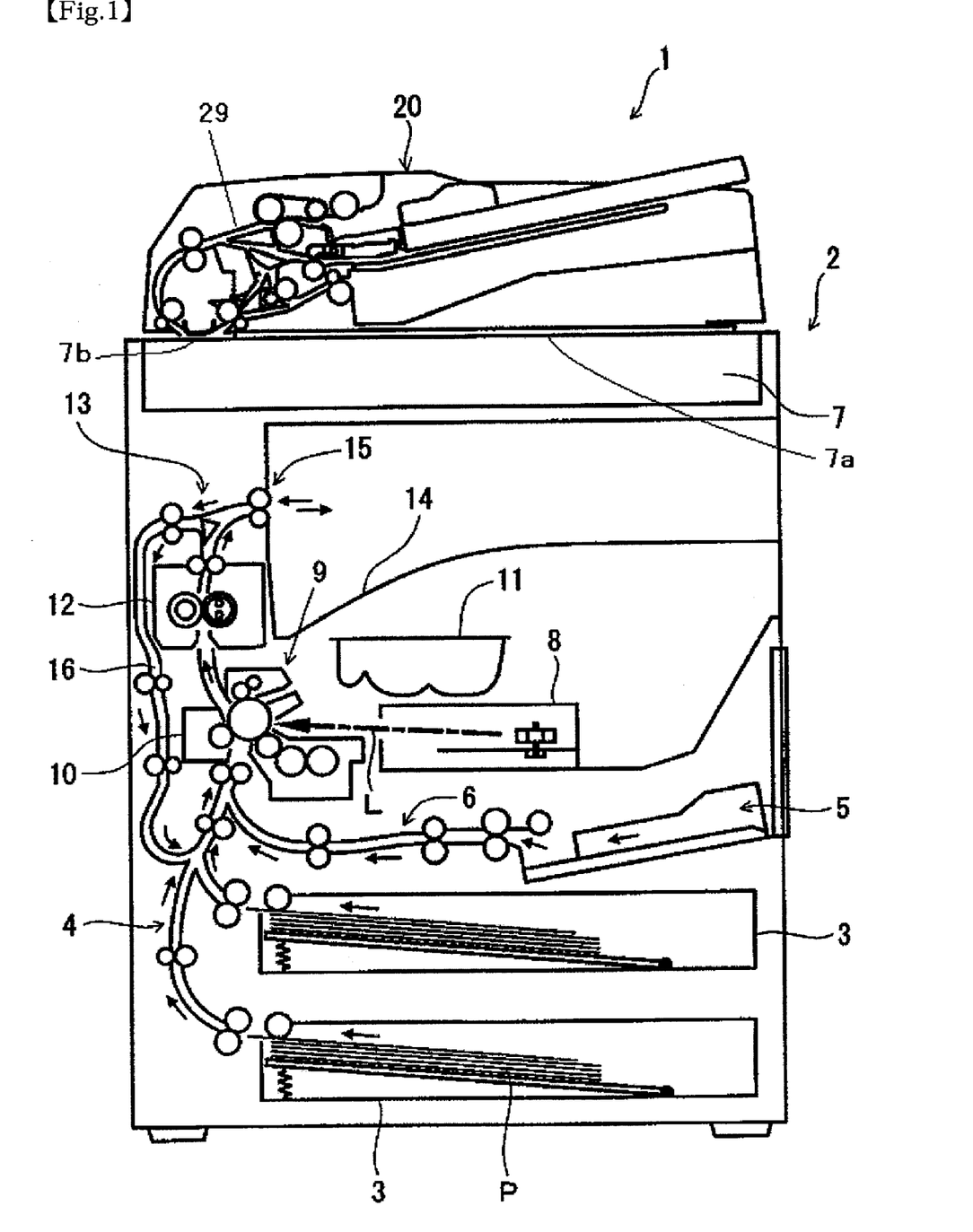
FIG. 1 is a front sectional view schematically showing a multifunction apparatus according to an embodiment of the present invention.

An embodiment of the present invention will be described below with reference to the drawings. FIG. 1 shows a section of a multifunction apparatus 1, which is an example of an image-forming apparatus, when viewed from a front side.

In the illustrated embodiment, the multifunction apparatus 1 includes an image-forming apparatus body 2 of inter-body sheet-eject type. A sheet-eject tray 14 is provided below an image-reading section 7.

An automatic document feeder 20 is mounted above the image-forming apparatus body 2, i.e., above the image-reading section 7. The automatic document feeder (ADF) 20 can automatically feed a document to a predetermined image-reading position. When the multifunction apparatus 1 is used as a copier, a facsimile, or a network scanner, the automatic document feeder 20 feeds the document, and the image-reading section 7 optically reads the image of the document.

A front-loading sheet-feed device is located at a lower portion of the image-forming apparatus body 2. In particular, vertically arranged, are two sheet-feed cassettes 3 at the sheet-feed device of this embodiment. The sheet-feed cassettes 3 are positioned in a vertical direction of the image-forming apparatus body 2. Each sheet-feed cassette 3 can be detached from the image-forming apparatus body 2. The inside of the sheet-feed cassette 3 is open to the outside when the sheet-feed cassette 3 is pulled from the front side of the multifunction apparatus 1. The inside of the sheet-feed cassette 3 is closed when the sheet-feed cassette 3 is pushed toward the rear side of the multifunction apparatus 1.

Solid arrows in FIG. 1 represent the feed paths and the feeding directions of the sheets.

Each sheet-feed cassette 3 contains sheets P of various types that are stacked and stored before image formation. The sheets P are separated and fed one at a time, leftward, from the sheet-feed cassette 3. The sheet P in the conveying path 4 is fed upward along a left side of the image-forming apparatus body 2.

A retractable manual feed tray 5 is provided at the right side of the image-forming apparatus body 2. A sheet fed from the manual feed tray 5 is fed to the conveying path 6, and then is fed upward.

In the image-forming apparatus body 2, a registration roller, an image-forming section 9, and a transfer section 10 are arranged in that order (heading toward downstream side) in the sheet feeding direction. An exposure section 8 and a toner container 11 are provided at the right side of the image-forming section 9. The exposure section 8 irradiates the photosensitive drum of the image-forming section 9 with laser beam L, and the latent image is developed with the toner from the toner container 11.

A fixer 12 and an eject branch 13 are provided downstream of the transfer section 10 in the sheet feeding direction. When a one-sided printing job is performed, a sheet ejected from the fixer 12 is ejected to the sheet-eject tray 14 through a sheet-eject roller 15.

A duplex print unit 16 is arranged between the eject branch 13 and the conveying path 4. The duplex print unit 16 causes the sheet ejected from the fixer 12 to return to the conveying path 4, and feeds the sheet to the image-forming section 9 again.

The automatic document feeder 20 includes an automatic document feeder body 21 capable of feeding a document located at the right side to the left side (FIG. 1) and ejecting the document to the right side again.

Figure 2:
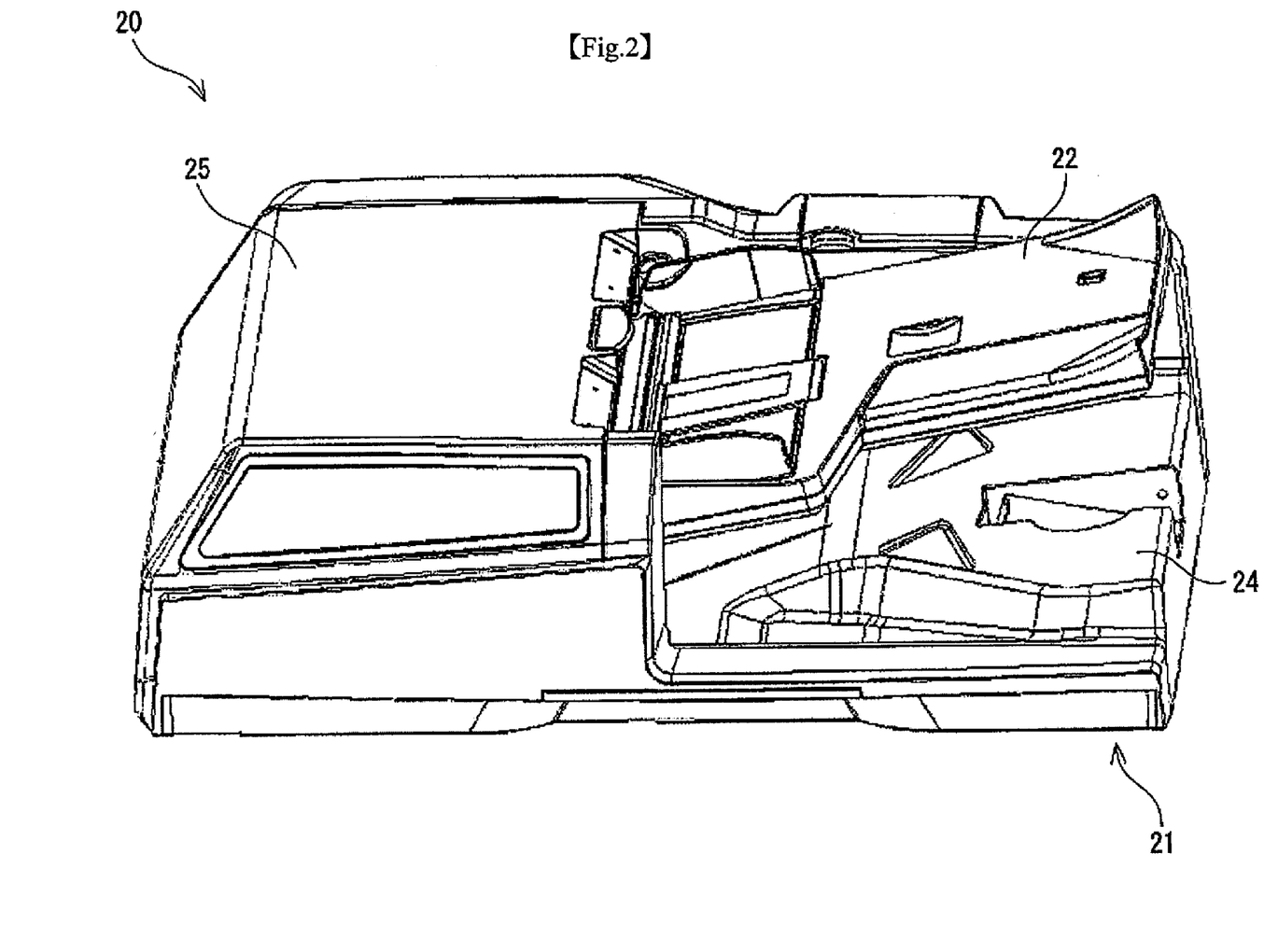
FIG. 2 is a perspective view showing the automatic document feeder of FIG. 1.

In particular, referring to FIG. 2, the automatic document feeder body 21 includes a document tray 22 extending from the center portion obliquely toward the upper right side. The document tray 22 is provided at the automatic document feeder body 21 in a rotatable manner at the center portion. A document is set on the document tray 22 before reading with the image-reading section 7.

The automatic document feeder body 21 includes a sheet-feed cover 25 at the left side of the document tray 22 (FIG. 2). The sheet-feed cover 25 is rotatably supported by the automatic document feeder body 21 at the left end in FIG. 2. The sheet-feed cover 25 can cause the conveying path 29 to be open to or closed to the outside. That is, the sheet-feed cover 25 in the state shown in FIG. 2 closes the conveying path in the automatic document feeder body 21. The inner surface of the sheet-feed cover 25 functions as a guide for the conveying path.

When the sheet-feed cover 25 is moved away from the side of the document tray 22 and is rotated counterclockwise in FIG. 2, the conveying path becomes open. Thus, various rollers, such as a pickup roller, a separation roller, etc., located on the conveying path, and a contact image sensor (CIS) which reads the document from the document tray 22 can be visually recognized.

Figure 3:
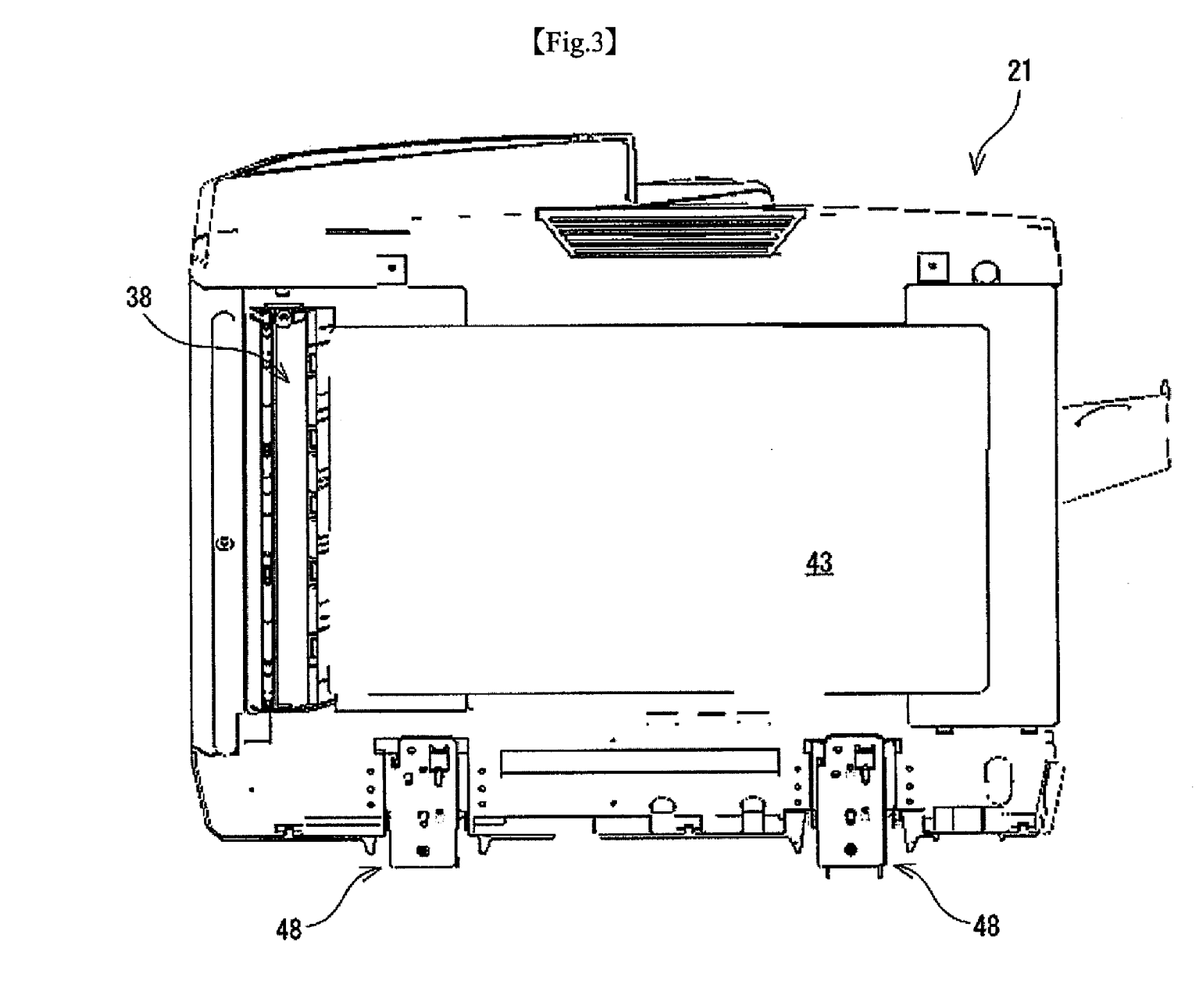
FIG. 3 is a perspective view showing the lower surface of the automatic document feeder of FIG. 2.

Also, the automatic document feeder 20 of this embodiment serves as a document cover. In particular, the automatic document feeder body 21 is rotatably supported by the image-forming apparatus body 2 via a hinge unit 48 at the rear side of the multifunction apparatus 1 (FIG. 3). The lower surface of the automatic document feeder body 21 can open or close a contact glass 7a of the image-reading section 7.

A pressure plate 43 is located at the lower surface of the automatic document feeder body 21. The pressure plate 43 faces the contact glass 7a, i.e., the large-width glass for manual reading. When the pressure plate 43 presses a document placed on the glass and a predetermined function key is pressed, the image-reading section 7 can read the image on the document.

In FIG. 3, a sheet-through reading guide 38 is provided at the automatic document feeder body 21 so as to face a sheet-through reading glass 7b which is different from the manual reading glass of the image-reading section 7 (in FIG. 1, the reading guide 38 being located at the left side of the manual reading glass). When the document passes through a position between the sheet-through reading glass 7b and the reading guide 38, a charge coupled device (CCD) located in the image-reading section 7 reads the image on the document (FIG. 2).

Figure 4:
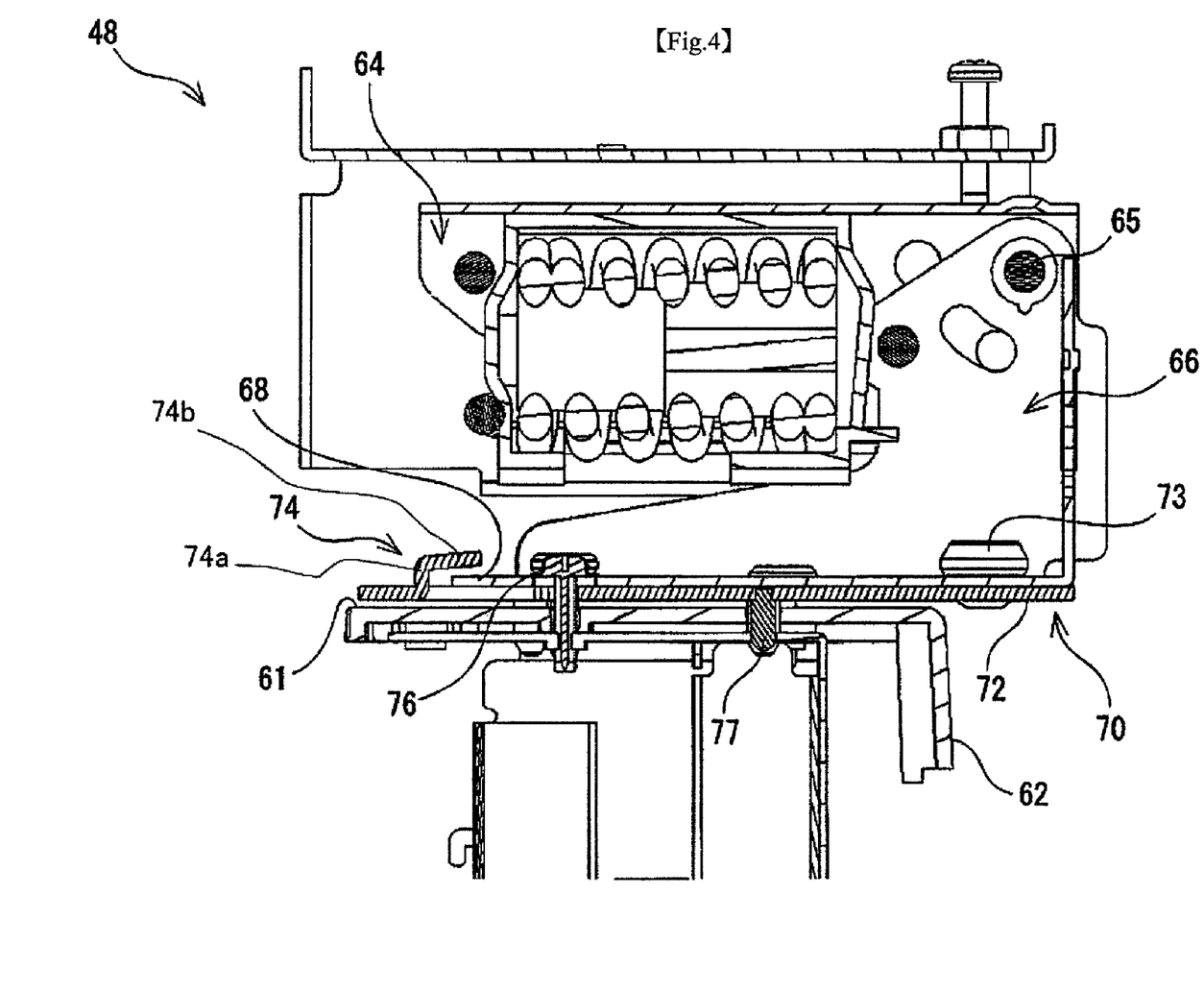
FIG. 4 is a side sectional view showing the hinge unit of FIG. 3.

The hinge unit 48 of this embodiment is fixed to the image-forming apparatus body 2 via a hinge attachment member 70 (FIG. 4).

The hinge unit 48 includes a movable member 64 to which the automatic document feeder 20 is attached and a fixed member 66 which is fixed to the image-forming apparatus body 2. When the movable member 64 is viewed from the front side of the multifunction apparatus 1 while the automatic document feeder body 21 closes the contact glass 7a, the movable member 64 has a substantially U-shape. The opening portion of the movable member 64 faces the upper surface 61 of the image-forming apparatus body 2.

Figure 5:
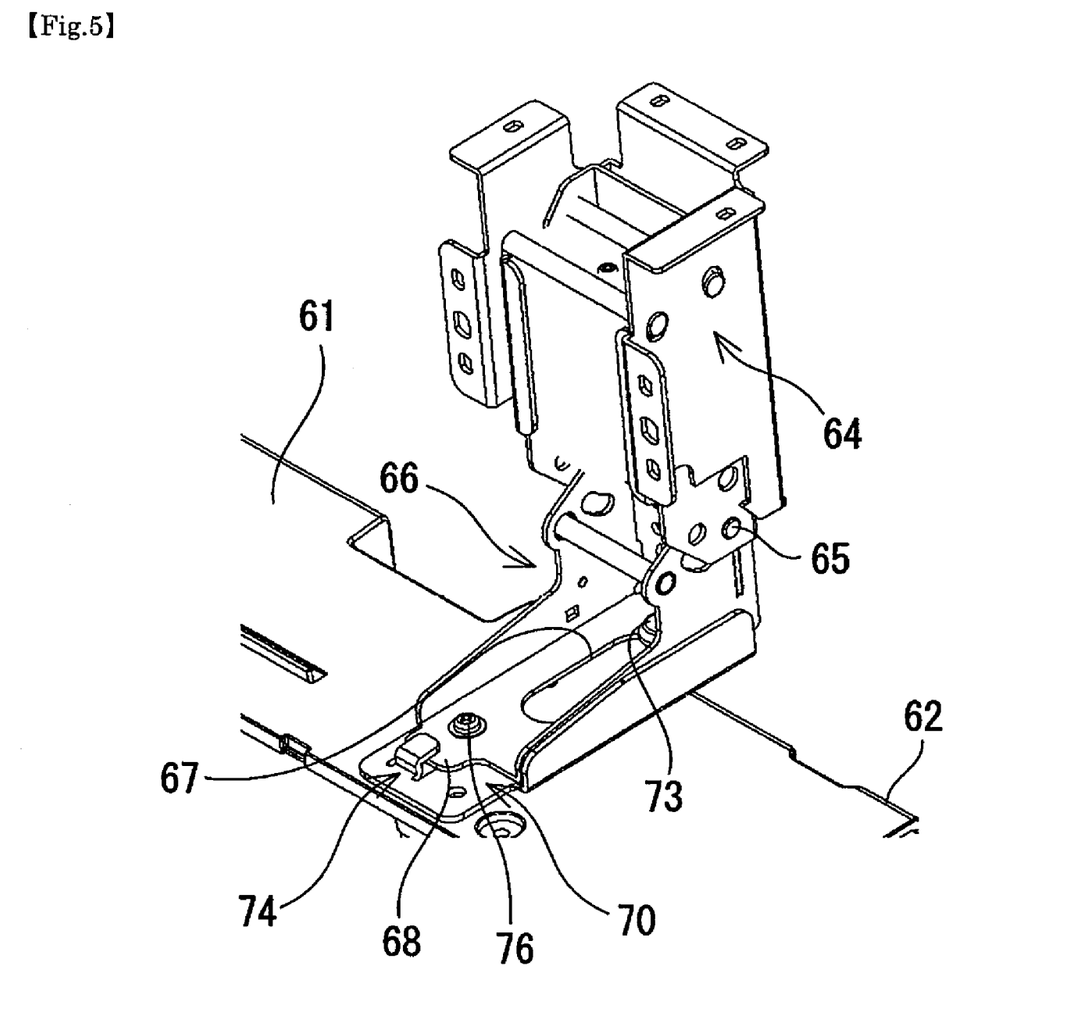
FIG. 5 is a perspective view showing the hinge unit when the device of FIG. 2 is open.

The movable member 64 extends from the front side toward the rear side of the multifunction apparatus 1. The tip end portion in a longitudinal direction of the movable member 64, located at the left side in FIG. 4, is positioned to face the upper side while the automatic document feeder body 21 opens the contact glass 7a (FIG. 5). The tip end portion is coupled to the rear side of the automatic document feeder body 21 by four screws (not shown). A dumber member is provided in the movable member 64, thereby providing a free stop function. Hence, the automatic document feeder body 21 is stopped at a desired opening angle.

In this embodiment, the rear end portion of the movable member 64 located at the right side in FIG. 4 protrudes to the outside from the rear side 62 of the image-forming apparatus body 2. The movable member 64 is coupled to a fixed member 66 at the protruding position. More specifically, the fixed member 66 is also substantially U-shape, and extends from the front side toward the rear side of the multifunction apparatus 1. A rear end portion in a longitudinal direction of the fixed member 66 protrudes from the rear side 62. A pivot shaft (support point) 65 is formed at the protruding position so as to extend from the right side toward the left side of the multifunction apparatus 1. Accordingly, the movable member 64 is rotatably supported by the fixed member 66 at a position outside the rear side 62.

While the contact glass 7a is closed as shown in FIG. 4, the bottom surface of the fixed member 66 faces the hinge attachment member 70 and the upper surface 61. The bottom surface of the fixed member 66 has an engagement hole 67. In particular, referring to FIG. 5, the engagement hole 67 has a diameter that gradually increases from a position located substantially below the pivot shaft 65 toward the front side. The engagement hole 67 penetrates through the bottom surface of the fixed member 66.

The bottom surface of the fixed member 66 has a retainment portion 68 at a position opposite to the position of the pivot shaft 65. The retainment portion 68 is located near the contact glass 7a.

The fixed member 66 is coupled to the hinge attachment member 70 and is fixed to the upper surface 61 of the image-forming apparatus body 2.

Figure 6:
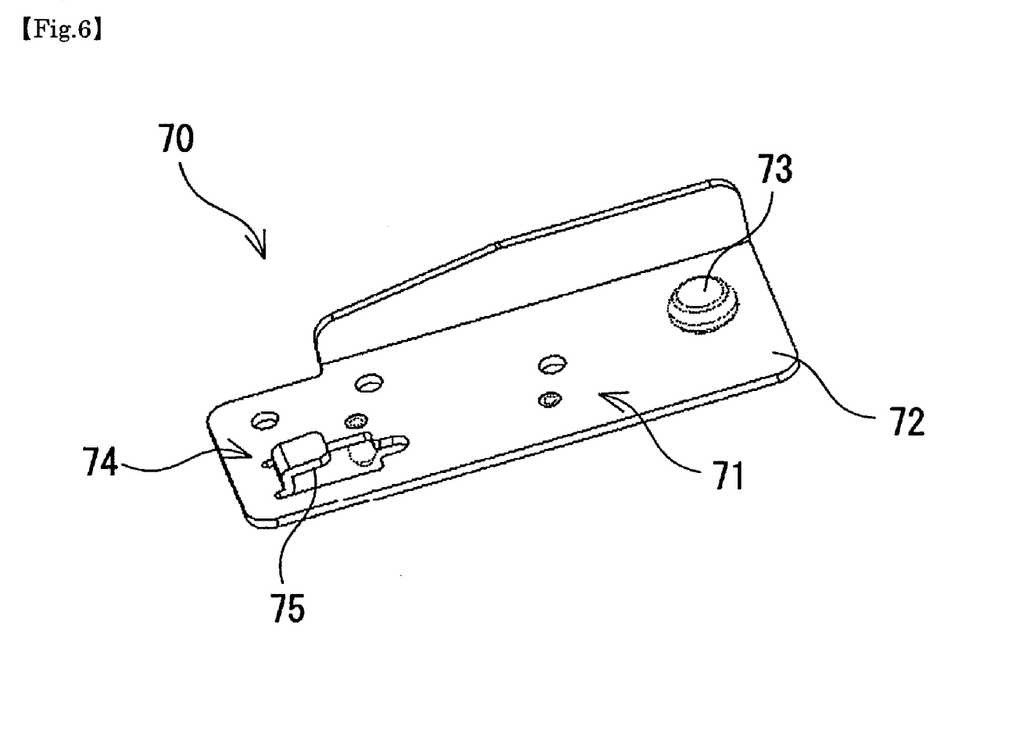
FIG. 6 is a perspective view showing the hinge attachment member of FIG. 5.

Referring now to FIGS. 4, 5, and 6, the hinge attachment member 70 of the illustrated embodiment includes a substantially L-shape base portion 71 when viewed from the front side of the multifunction apparatus 1. The hinge attachment member 70 is fixed to the upper surface 61 of the image-forming apparatus body 2 by a predetermined screw. The base portion 71 extends substantially horizontally in a front-rear direction in a manner similar to the fixed member 66. A rear end portion (one end side) of the base portion 71 serves as a protruding portion 72 protruding to the outside from the rear side 62. The protruding portion 72 has an engagement protrusion (engagement pin) 73 which holds the bottom surface of the fixed member 66 at a position near the pivot shaft 65.

The diameter of the head portion of the engagement pin 73 is smaller than the diameter of the larger diameter portion (insertion portion) of the engagement hole 67 of the fixed member 66, but is slightly larger than the diameter of the smaller-diameter portion (engagement portion) located substantially below the pivot shaft 65.

The base portion 71 of the illustrated embodiment has a retainment hook 74 at a position near the front side and opposite to the position of the pivot shaft 65.

When viewed with the contact glass 7a open as in FIG. 5 the attachment state of the automatic document feeder 20 is shown. The direction of gravity on the movable member 64 of the hinge unit 48 is near the rear side with respect to a line vertically extending from the pivot shaft 65. Hence, a moment of rotation is applied to the hinge unit 48 so as to be inclined toward the rear side. The retainment hook 74 is provided at a position opposite to the direction of gravity with respect to the pivot shaft 65, i.e., at a position near the tip end portion (the other end side) in the longitudinal direction of the base portion 71. The retainment hook 74 of the illustrated embodiment is formed into an L-shape. The retainment hook 74 includes a leg 74a extending from the upper surface of the base portion 71 toward the upper side, and a claw 74b that is bent and extends toward the engagement pin 73.

A positioning pin 77 is provided at the lower surface of the base portion 71 (FIG. 4). The positioning pin 77 functions to fix the hinge attachment member 70 to the upper surface 61.

As described above, the hinge attachment member 70 is located at the upper surface 61 and is fixed by a screw, the automatic document feeder body 21 in a standing manner is lowered to the upper surface 61, and the hinge unit 48 is temporarily fixed to the hinge attachment member 70.

The engagement pin 73 is located inside the large-diameter portion of the engagement hole 67, and the hinge unit 48 is horizontally moved toward the contact glass 7a. Thus, the small-diameter portion of the engagement hole 67 engages with a peripheral edge of the engagement pin 73. Also, the retainment portion 68 engages with the retainment hook 74. In particular, the retainment portion 68 is held between a lower surface 75 of the claw 74b of the retainment hook 74 and an upper surface of the base portion 71.

The automatic document feeder body 21 provided with the hinge unit 48 is temporarily fixed to the upper surface 61 of the image-forming apparatus body 2 including the hinge attachment member 70. Then, the fixed member 66 is fastened to the upper surface 61 by a screw 76 from the upper side of the base portion 71. Accordingly, the automatic document feeder body 21 and the hinge unit 48 are fixed to the image-forming apparatus body 2 via the hinge attachment member 70.

In the automatic document feeder 20, the document is placed on the document tray 22. When the desired key is pressed, the document is fed to the image-reading position of the image-reading section 7, the image is read, and the document is ejected to an eject tray 24. In other situations, the document is placed on the contact glass 7*a*. When the desired key is pressed, the document pressed by the pressure plate 43 is read by the image-reading section 7.

Meanwhile, in the multifunction apparatus 1 including the automatic document feeder 20 mounted thereon, sheets in the sheet-feed cassette 3 or sheets on the manual feed tray 5 are separated one at a time and the separated sheet is fed to the registration roller in the image-forming apparatus body 2. The registration roller feeds the sheet to the transfer section 10, while correcting skew feeding of the sheet, in synchronization with the formation timing of a toner image to be formed by the image-forming section 9.

In addition, in the multifunction apparatus 1, the exposure section 8 irradiates with the laser beam L in accordance with the image data from a controller (not shown). Thus, an electrostatic latent image of a document image is formed on the photosensitive drum in the image-forming section 9. Then, a toner image is formed on the photosensitive drum based on the latent image by a developing device. The toner image is transferred onto the sheet.

Then, the sheet is fed to the fixer 12 while bearing the unfixed toner image. The fixer 12 fixes the toner image onto the sheet. Then, the sheet ejected from the fixer 12 passes through the eject branch 13 and is ejected to the sheet-eject tray 14.

The above procedure is used for one-sided printing. In contrast, when duplex printing is to be performed, the sheet ejected from the fixer 12 returns to the duplex print unit 16 immediately before the sheet is ejected to the sheet-eject tray 14. The sheet is fed to the conveying path 4, and is fed to the transfer section 10 again. In this situation, a toner image is transferred onto the remaining blank surface of the sheet.

As described above, in this embodiment, the document is fed from the document tray 22, the image on the document is read by the image-reading section 7, and then the document is ejected to the eject tray 24.

The automatic document feeder 20, the hinge unit 48, and the hinge attachment member 70 are provided. The hinge attachment member 70 causes the hinge unit 48 to be fixed to the image-forming apparatus body 2. The hinge unit 48 rotatably supports the automatic document feeder 20. Thus, the automatic document feeder 20 can open or close the contact glass 7*a* of the image-reading section 7 around the pivot shaft of the hinge unit 48.

Herein, the hinge attachment member 70 includes the plate-shape base 71 fixed to the upper surface 61 of the image-forming apparatus body 2 by the screw 76. The base portion 71 includes the engagement pin 73 at one end side, with the engagement pin 73 protruding substantially vertically. The engagement pin 73 supports the position of the hinge unit 48 near the pivot shaft 65.

With only the engagement pin 73, the automatic document feeder 20 having a weight of about 15 kg may be inclined and fall to the rear side. Thus, the base portion 71 of the illustrated embodiment further includes the retainment hook 74. The retainment hook 74 substantially vertically holds the retainment portion 68 at the other end, the retainment portion 68 being located at a position opposite to the position of the pivot shaft 65. Accordingly, the automatic document feeder 20 can be prevented from falling to the rear side.

Not only is the hinge unit 48 held merely by a plurality of positions, but the hinge unit 48 is also held at two positions by the ends of both sides of the base portion 71. Accordingly, the posture of the automatic document feeder 20 becomes stable as compared with the structure of the prior art. The opening angle of the automatic document feeder 20 can be set to 90 degrees or greater. Thus, the automatic document feeder 20 can be prevented from falling to the front side in addition to the rear side.

Therefore, the self-standing state of the automatic document feeder 20 can be reliably maintained. Compared with the structure of the prior art, in which the automatic document feeder does not stand by itself and hence the automatic document feeder has to be supported by another worker or with one hand of the worker, the job of mounting the automatic document feeder 20 on the image-forming apparatus body 2, more particularly, the task by which the hinge unit 48, coupled to the automatic document feeder 20, is fastened to the upper surface 61 of the hinge attachment member 70 by the screw 76 from the upper side can be facilitated.

Further, in the base portion 71 of the hinge attachment member 70, the engagement pin 73 and the retainment hook 74 are located at positions opposite to each other. When the engagement pin 73 engages with the engagement hole 67 of the fixed member 66, the lower surface 75 of the claw 74*b* of the retainment hook 74 engages with the retainment portion 68 of the fixed member 66. Accordingly, the task of mounting the automatic document feeder 20 on the image-forming apparatus body 2 can be facilitated, and the automatic document feeder 20 can be reliably maintained.

Still further, during operation of the automatic document feeder 20, the opening angle may be controlled to, for example, about 60 degrees by providing regulating means. During the attachment task of the automatic document feeder 20, the maximum opening angle may be set to, for example, 95 degrees. Thus, the point of gravity of the hinge unit 48 is at a position opposite to the position of the retainment hook 74 with respect to the pivot shaft 65. That is, when the worker's hand is released from the automatic document feeder 20 in the self-standing manner, the rotation moment toward the rear side is applied to the automatic document feeder 20. Since the retainment hook 74 holds the retainment portion 68 substantially vertically, the rotation of the automatic document feeder 20 can be prevented, hereby further reliably maintaining the automatic document feeder 20 in the self-standing state.

Since the self-standing state of the automatic document feeder 20 is reliably maintained, the time required for assembling the multifunction apparatus 1 can be reduced and the manufacturing cost of the multifunction apparatus 1 can be reduced.

It should be noted that various modifications to the illustrated embodiments may be made. For example, the respective rear end portions of the movable member 64, the fixed member 66, and the base portion 71 do not have to protrude from the rear side 62. Also, while the multifunction apparatus is described as an example of the image-forming apparatus in the above-described embodiment, the present invention can be applied to a copier, a printer, etc., including the automatic document feeder.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An attachment structure for an automatic document feeder which is mounted in a manner openable and closeable with respect to an upper surface of an apparatus at which an image-reading section is provided, the attachment structure comprising:

a hinge unit which rotatably supports the automatic document feeder at one end of the upper surface of the apparatus; and a hinge attachment member fixed to the upper surface of the apparatus and coupled to the hinge unit, the hinge attachment member includes a base portion on which the hinge unit is mounted, an engagement protrusion located on an upper surface of the base portion at one end located at a rear side of the apparatus, the engagement protrusion engaging with and holding the hinge unit, and a retainment hook provided at the other end located at the front of the apparatus, the retainment hook preventing the automatic document feeder from falling.

2. The attachment structure of the automatic document feeder according to claim 1, wherein:

the hinge unit includes a fixed member coupled to the hinge attachment member, and a movable member coupled to the automatic document feeder, the fixed member includes a bottom surface, the bottom surface having an engagement hole engaging with the engagement protrusion, and a retainment portion located at the other end and being capable of engaging with the retainment hook.

3. The attachment structure of the automatic document feeder according to claim 2, wherein:

the retainment hook includes a leg extending vertically from the base portion, and a claw extending substantially horizontally from the leg toward one end, the engagement hole has an engagement portion provided at the one end and engaging with the engagement protrusion, and an insertion portion which extends from the engagement portion toward the other end and allows the engagement protrusion to be inserted, and the retainment portion is capable of engaging with the claw while engagement between the engagement protrusion and the engagement portion is achieved by inserting the engagement protrusion into the insertion portion of the fixed member and sliding the fixed member toward the other end.

4. The attachment structure of the automatic document feeder according to claim 3, wherein:

the claw retains the retainment portion while the automatic document feeder is inclined toward the rear side of the apparatus with the engagement protrusion acting as a fulcrum when the engagement protrusion is engaged with the engagement hole of the fixed member.

5. An image-reading device comprising the attachment structure of the automatic document feeder according to claim 1.

6. An image-forming apparatus comprising the attachment structure of the automatic document feeder according to claim 1.

7. An attachment structure for an automatic document feeder comprising:

a hinge unit which supports the automatic document feeder at one end of an apparatus; and a hinge attachment member fixed to an upper surface of the apparatus and coupled to the hinge unit, the hinge attachment member includes a base portion on which the hinge unit is mounted, an engagement protrusion located at one end and at a rear side of the apparatus, the engagement protrusion engaging with and holding the hinge unit, and a retainment hook located at another end at a front of the apparatus.

* * * * *